United States Patent
Baboo et al.

(10) Patent No.: US 11,172,648 B2
(45) Date of Patent: Nov. 16, 2021

(54) NON-HUMAN PRIMATE RESTRAINT SYSTEM

(71) Applicant: Bioculture Mauritius, Ltd., Rivière des Anguilles (MU)

(72) Inventors: Desiré Clive Eric Baboo, Curepipe (MU); Feroz Mamode Sawar, Savanne (MU)

( * ) Notice: Subject to any disclaimer, the term of this patent is extended or adjusted under 35 U.S.C. 154(b) by 126 days.

(21) Appl. No.: 16/660,786

(22) Filed: Oct. 22, 2019

(65) Prior Publication Data

US 2020/0128781 A1  Apr. 30, 2020

Related U.S. Application Data

(60) Provisional application No. 62/750,246, filed on Oct. 24, 2018.

(51) Int. Cl.
*A01K 1/03* (2006.01)
*A01K 1/00* (2006.01)
*A01K 1/06* (2006.01)

(52) U.S. Cl.
CPC ............ *A01K 1/031* (2013.01); *A01K 1/0017* (2013.01); *A01K 1/0613* (2013.01); *A01K 2227/106* (2013.01)

(58) Field of Classification Search
CPC .... A01K 1/031; A01K 1/0017; A01K 1/0613; A01K 2227/106; A01K 1/0023; A61B 5/70; A61B 5/702; A47B 53/02; A47B 53/00
USPC ................................................ 119/843, 840
See application file for complete search history.

(56) References Cited

U.S. PATENT DOCUMENTS

| | | | | |
|---|---|---|---|---|
| 1,295,137 A * | 2/1919 | Drugociu | ............... | A47B 53/00 312/299 |
| 2,982,248 A * | 5/1961 | Hosko, Jr. | ............ | A01K 1/0613 119/729 |
| 3,399,654 A * | 9/1968 | Schroer | ................... | A01K 1/031 119/752 |
| 3,467,064 A * | 9/1969 | Glass | ..................... | A01K 1/031 119/481 |
| 3,747,567 A * | 7/1973 | De Smit | .................. | A01K 1/03 119/473 |
| 4,995,335 A * | 2/1991 | Wright | ................... | A01K 15/00 119/738 |
| 5,036,795 A * | 8/1991 | Houghton | .............. | A01K 1/031 119/452 |
| 6,279,512 B1 * | 8/2001 | Lane | .................... | A01K 1/0029 119/843 |

(Continued)

*Primary Examiner* — Tien Q Dinh
*Assistant Examiner* — Zoe Tam Tran
(74) *Attorney, Agent, or Firm* — Diana Mederos; Steven Schlackman

(57) ABSTRACT

A non-human primate restraint system comprising a complex of a manipulating chamber and a restraint chamber. The system provides a humane, interactive, and safe structure and methods for leading non-human primates from a chute or a cage, through the manipulating chamber, and into a restraint chamber. The restraint chamber is removably attached to the manipulating chamber. The restraint chamber has an upper part with a screen, a middle portion with slots to accommodate platforms, and a lower section with a screen. The screens can be retracted or removed to access either the top portion or lower portion of the NHP.

15 Claims, 6 Drawing Sheets

(56) References Cited

U.S. PATENT DOCUMENTS

| | | | |
|---|---|---|---|
| 7,644,543 B2* | 1/2010 | Amidon, II | E04H 3/08 |
| | | | 52/64 |
| 8,141,517 B2* | 3/2012 | Shimoda | A01K 1/034 |
| | | | 119/473 |
| 10,694,714 B2* | 6/2020 | McGeehan | B62B 1/12 |
| 2005/0115512 A1* | 6/2005 | Fritsch | A01K 1/0088 |
| | | | 119/454 |

* cited by examiner

NON-HUMAN PRIMATE RESTRAINT SYSTEM

CROSS REFERENCE TO RELATED APPLICATION

This application claims the benefit of U.S. Provisional Application No. 62/750,246, entitled Non-human Primate Restraint System, filed Oct. 24, 2018, which is hereby incorporated by reference in its entirety for all purposes.

FIELD OF THE DISCLOSURE

The present disclosure relates to methods and apparatuses for a non-human primate restraint system. More specifically, the present disclosure presents an improved system for use in connection with laboratory research and veterinary applications.

BACKGROUND OF THE DISCLOSURE

Many research institutions and facilities contain at least one non-human primate ("NHP") animal center or facility. NHPs commonly used include rhesus and cynomolgus macaques. NHPs are essential for use as test subjects in biomedical, veterinary, pharmaceutical, and bioterror research. For example, NHPs allow research investigators to learn more about how pre-clinical trial drugs, xenobiotics, xenotransplantation, infectious diseases, epigenetic regulation, medical devices, and cognitive and behavioral therapies affect a model in vivo. NHPs are physiologically similar to humans, particularly in regard to hormone production, reproduction, immune responses, organ systems, and metabolic pathways. The resulting data is beneficial, especially for translational research, for indicating how a proposed drug, and infectious disease, or a new gene therapy may affect humans.

While a valuable research model, there are also animal welfare concerns regarding the use of NHPs. Some entities and governments may even phase out the use of NHPs, or any animal model, and require replacement with new in vitro methods such as artificial human models, in silico models, cell culture and organoid techniques, and making inferences from omics data. These methods may reduce harm to NHPs, but there are serious gaps in the data obtained from these alternatives, especially in drug development where systemic metabolic pathways are critical in evaluating pharmacokinetics and pharmacodynamics of drugs and therapeutics. Proposed alternatives to animal models in general yield data that requires too many inferences in determining the likelihood of similar effect in humans. The nexus is too far attenuated. There will be a greater risk of harm to humans in clinical trials. Therefore, NHPs are essential in bridging the gap in translational research whereby a proposed drug or therapeutic can more safely develop from the laboratory bench to the human patient bedside.

Some methods and devices are presently used to minimize harm to NHPs. Restraining devices in particular help to hold NHPs in place while biological samples are obtained or a drug is administered to the NHP. Some of the restraining devices used include squeeze-back cages; manual restraint; restraint boards and chairs; tethers, chutes, and nets. With squeeze-back cages, the NHP is essentially cornered in its cage to where it cannot move. With manual restraint, the NHP is held by at least two people while biological samples are obtained. With the rest, the NHP is confined and often resists.

Other non-restraint methods include sedatives, training, and distraction. These alternatives are more time consuming, expensive, and do not adequately protect the laboratory investigators from unanticipated bites, scratches, or contamination. For example, an NHP may be trained to go to a certain location and sit still while being distracted with a treat or activity while a blood sample is collected. This takes time to train the NHP and does not guarantee the NHP will not deviate from its regular behavior acid harm the investigator or handler.

Both the traditional and alternative methods and devices result in stress and hormone alteration such as elevated cortisol levels. This in turn may skew or inaccurately affect the results of the pre-clinical testing data.

SUMMARY OF THE DISCLOSURE

What is needed is the non-human primate restraint system that provides a customizable and portable complex comprising a manipulating chamber and a restraint chamber. The system is integrated or attached to NHP chutes or cages. The NHP is humanely led into the manipulating chamber through an entrance and into the manipulating chamber interior space. Swivel doors prevent the NHP from retreating to a chute or cage and help guide the NHP toward the restraint chamber. A person controls the swivel doors via a swivel handle and interacts and distract the NHP at cage portions of the manipulating chamber.

The manipulating chamber comprises a frame with walls, top and bottom surfaces, doors, and at least one cage portion defining an interior space and an exterior space. The manipulating chamber is suitable to accommodate an NHP. A person opens and closes a swivel door that helps guide the NHP from the entrance to the cage portion and to the exit through the cage door and into the restraint chamber.

The restraint chamber comprises a cage door that is lifted and lowered along a cage door slot to allow entrance into and holding of the NHP in the restraint chamber. The chamber has at least one handle for portability. The chamber preferably has a semi cylindrical frame with defining an upper part, middle portion, and a lower part. The middle portion comprises divider slots and divider slot rails that accommodate a platform having a platform cutout to comfortably fit around the NHP's midsection.

The complex of both the manipulating chamber connected to the restraint chamber can be connected to the NHP's cage or chute. However, it is also possible to attach the restraint chamber directly to the NHP's cage or chute. The NHP is ultimately led into the restraint chamber and is preferably standing upright with its head, neck, shoulders, and arms placed above the middle portion and its abdomen and legs placed at and below the middle portion. A platform is inserted between divider slot rails and through a divider slot in the middle portion. The NHP rests its arms on top of the platform. The NHP is unable to reach its lower body below the platform. The NHP can be distracted with treats, objects, puzzles, and other interaction while a biological sample is obtained. The cage door can have a cage door slot, so the NHP's tail may comfortably fit.

Biological samples can be taken from either the NHP's upper body or lower body by accessing the NHP through either the upper part or lower part by opening, removing, or retracting the upper screen or the lower screen. In preferred embodiments, the lower screen is opened, removed, or retracted, and a biological sample is obtained from the NHP's lower body. The platform prevents the NHP from moving and hurting itself and prevents the NHP from scratching or biting the person obtaining the sample.

Once a biological sample is obtained, the screens are replaced or closed, the platform is removed, the cage door is lifted, and the NHP is led back to its cage.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

Figure 1:
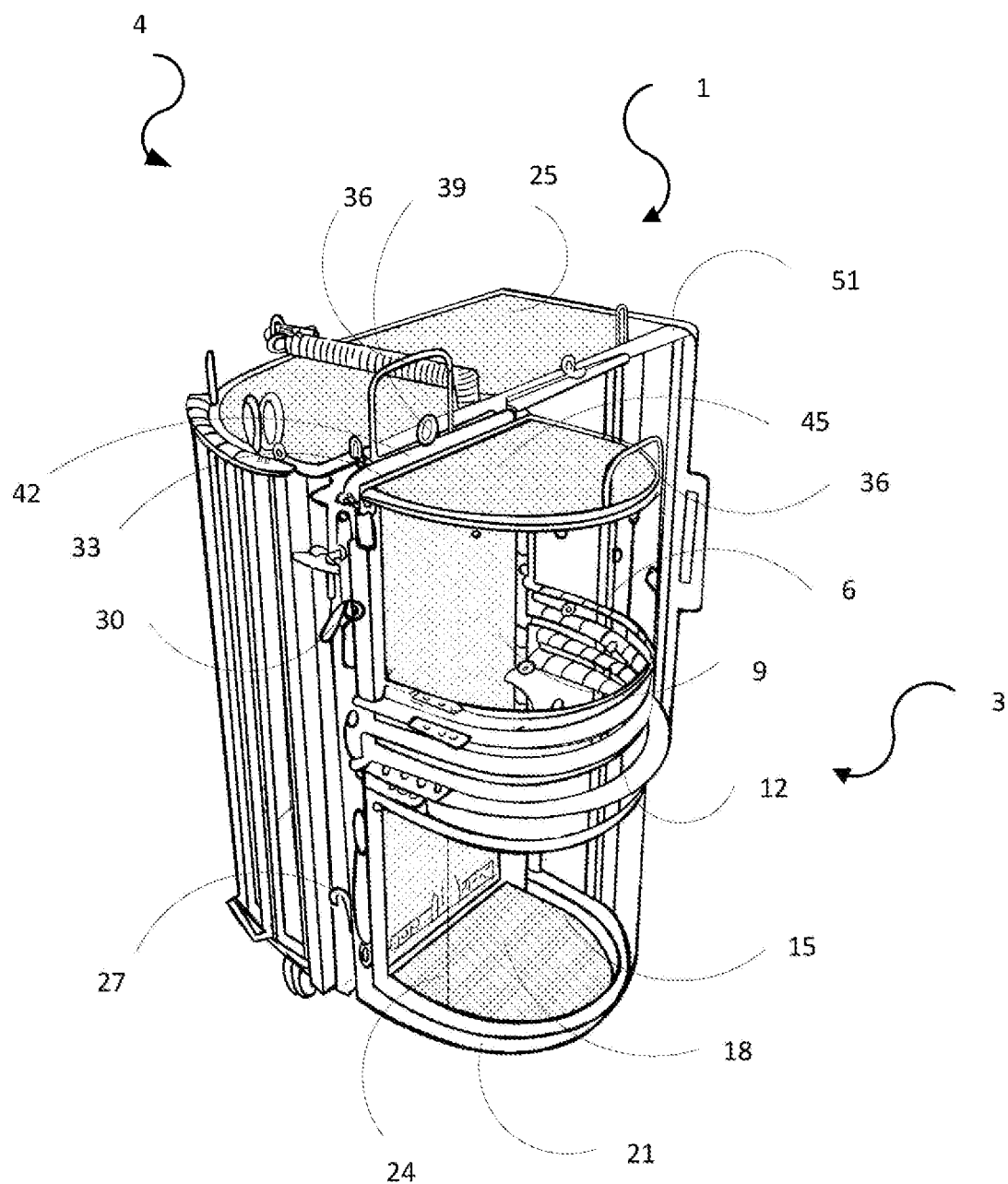
FIG. 1 shows affront perspective view of an exemplary system complex of a manipulating chamber and a restraint chamber.

REFERENCE NUMERALS OF THE DRAWINGS 1. manipulating chamber
3. restraint chamber
4. system complex
6. upper part
9. upper screen
12. middle portion
15. lower part
18. lower screen
21. lower section bottom frame
24. bottom surface
25. manipulating chamber top surface
27. mounting hook
30. fastener
33. cage door slot
36. carrying handle
39. cage door handle
42. cage door
45. top surface
48. restraint chamber frame
51. manipulating chamber frame
54. restraint chamber side frame
57. restraint chamber interior space
60. divider slot rail
63. divider slot
64. lower slit
66. screen vent holes
69. upper section top frame
71. upper section bottom frame
74. lower section upper frame
77. swivel handle
80. swivel
83. swivel lock
86. cage portion
89. manipulating chamber interior space
92. manipulating chamber exterior space
95. proximal door
98. manipulating chamber side
101. swivel door frame
104. manipulating chamber bottom surface
107. swivel door
110. entrance from cage
113. exit to restraint chamber
116. mount hook receiver
119. proximal end
121. distal end
124. top overhang
127. bottom platform
130. screen lock
133. platform
136. platform lock
139. platform cutout

DETAILED DESCRIPTION

The present disclosure provides generally for a non-human primate ("NHP") restraint system. According to the present disclosure, an NHP restraint system. The NHP restraint system disclosed ("the system") is a passive restraint system designed to improve safety for laboratory personnel, make the NHPs more comfortable, and increase ease and efficiency for NHP transport and restraint. The system generally comprises a complex of a manipulating chamber and a restraint chamber. The system may be used with NHPs such as macaque species commonly used in laboratory tests. However, the system is not limited by dimension and may be built in various sizes and shapes. In some embodiments, the system may be built to accommodate murine and rabbit models as well. The system encourages positive reinforcement where the NHP or other test subject voluntarily enters the system and remains comfortable throughout the transport or specimen collection or evaluation session.

In the following sections, detailed descriptions of examples and methods of the disclosure will be given. The description of both preferred and alternative examples are exemplary only, and it is understood that to those skilled in the art that variations, modifications, and alterations may be apparent. It is therefore to be understood that the examples do not limit the broadness of the aspects of the underlying disclosure as defined by the claims.

Referring now to FIG. 1, a front perspective view of an exemplary system complex of a manipulating chamber and a restraint chamber is shown. A complex 4 comprises a manipulating chamber 1 and a restraint chamber 3. A manipulating chamber as shown comprises a manipulating chamber top surface 25, a top surface 45, and a manipulating chamber frame 51. A restraint chamber as shown comprises a panel handle 39, a carrying handle 36, a cage door slot 33, a cage door 42, a fastener 30, at least one mounting hook 27, a bottom surface 24, a lower section bottom frame 21, a lower screen 18, a lower part 15, a middle portion 12, an upper screen 9, an upper part 6, a top surface 45, and a restraint chamber frame 48.

Generally, the system is comprised of frames for the manipulating chamber and the restraint chamber that may be made out of metal, plastic, combinations thereof, and any rigid, hollow, solid, or semi-rigid material. The frames may contain fasteners such as locking screws that aid in customizing the area of restriction or movement of the NHP in the upper part. The frames may also contain at least one handle to make transport easier. The manipulating chamber frames and the restraint chamber frames may have coordinating hooks, receivers, male-female attachment pieces, or other accommodating parts so the chambers can be removably attached to one another.

The restraint chamber may also serve as a temporary transport cage for NHPs. The restraint chamber is hooked onto the manipulating chamber. A person grabs the cage door handle to raise the cage door. The cage door is preferably a panel that is slid up and down a cage door slot that aligns the cage door, encompassing at least the edges of the cage door to substantially maintain an upright and straight position. Fasteners along the side frame may be used to lock the cage door open or shut by deploying a lever, bar, or screw to prevent the cage door from substantially moving up or down to clear the entrance into the restraint chamber. The NHP is led into the restraint chamber and the cage door is released and slid down to the bottom surface and locked in place. The restraint chamber is released from the manipulating chamber, and the NHP can be transported comfortably in the restraint chamber.

Figure 2:
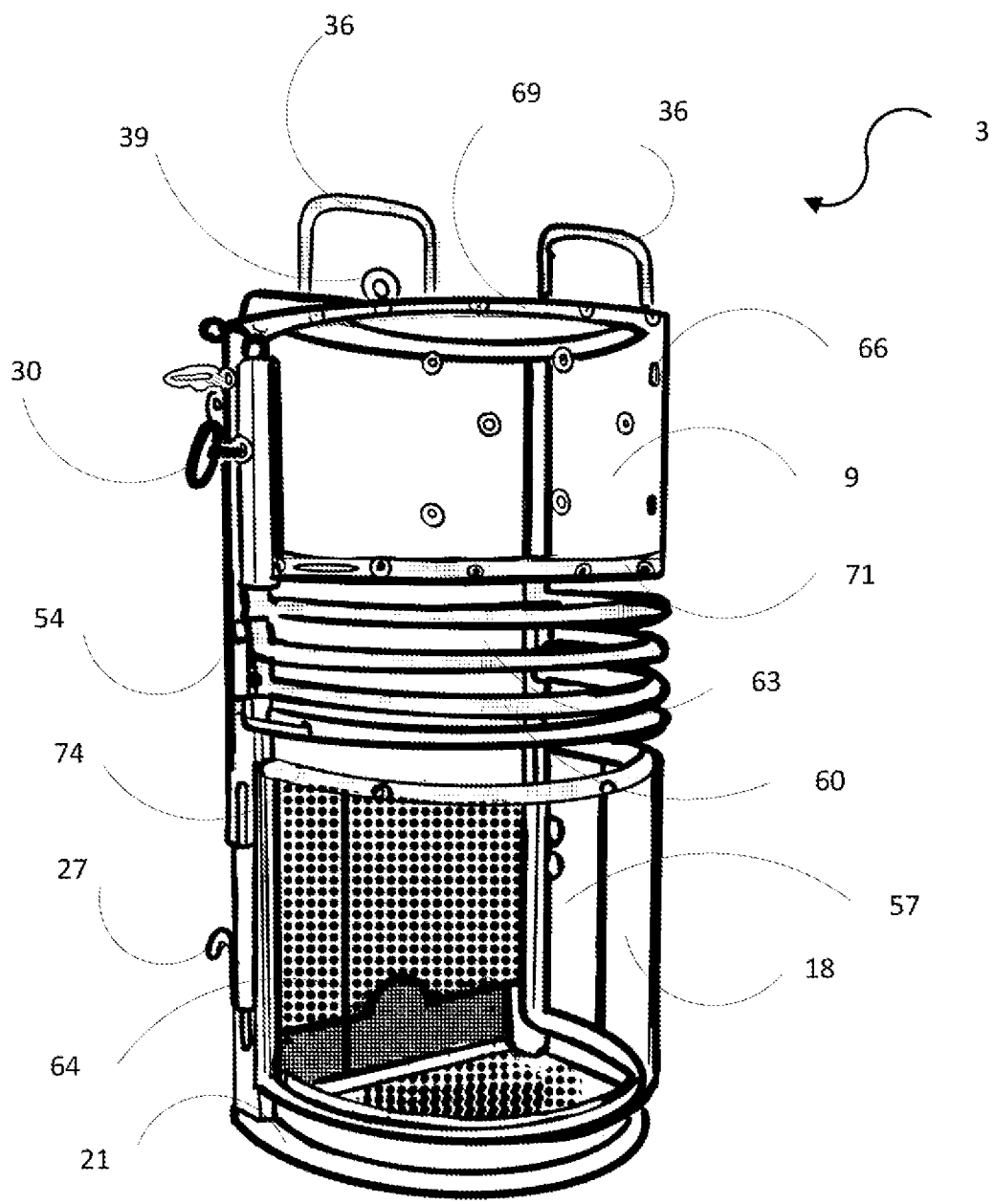
FIG. 2 shows a trout perspective view of an exemplary restraint chamber.

Referring now to FIG. 2, a front perspective view of an exemplary restraint chamber is shown. As shown, the restraint chamber 3 comprises a restraint chamber side frame 54, a restraint chamber interior space 57, a plurality of divider slot rails 60, a plurality of divider slots 63, a lower slit 64, screen vent holes 66, an upper section top frame 69, an upper section bottom frame 71, a lower section upper frame 74, a lower section bottom frame 21, a lower screen 18, an upper screen 9, a handle 36 at a proximal end and a handle 36 at a distal end, a cage door handle 39, a fastener 30, and at least one mounting hook 27.

The restraint chamber comprises a half transverse cylinder chamber with a front wall or a screen made out of a substantially transparent material such as tempered glass, acrylic, or plastic. The front wall or screen may have holes, drawers, or doors where laboratory personnel may provide treats to the NHP. This allows the laboratory personnel to be able to distract, console, or otherwise interact with the NHP during, before, or after specimen collection.

Divider slots and divider slot rails may be contoured into a half cylindrical structure to provide optimal access and comfort according to the shape of the NHP's body. The slots provide space for peripheral accessories such as planks, platforms, bars, or other device to restrict or distract the NHP, make the NHP more comfortable, adjust the system according to the NHP size, and to add further protection for the laboratory personnel. These safeguard accessories may be inserted into the slots and may be secured in place with at least one fastener or locking mechanism. The lower part may also contain at least one door or access portal such as a hinged door with a locking mechanism or fastener. The door may be opened once the NHP is in place and comfortable. The laboratory personnel may reach into the system to access the NHP. Once evaluation or specimen collection is complete, the door may be closed and locked.

Figure 3:
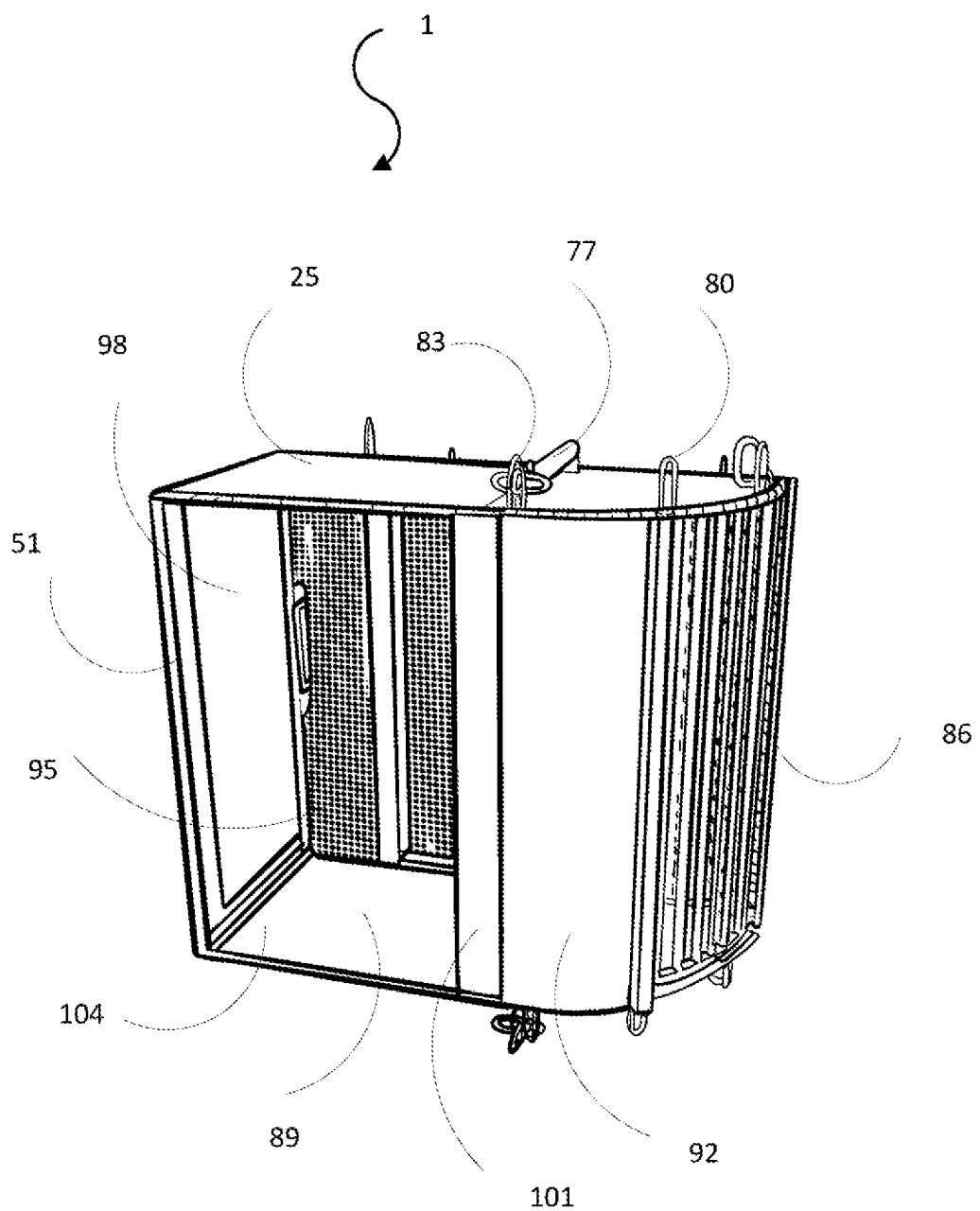
FIG. 3 shows a rear perspective view of an exemplary manipulating chamber.

Referring now to FIG. 3, a rear perspective view of an exemplary manipulating chamber a is shown. The manipulating chamber 1 comprises a swivel handle 77, a swivel hook 80, a swivel lock 83, a cage portion 86, a manipulating chamber interior space 89, a manipulating chamber exterior surface 92, a proximal door 95, a manipulating chamber side, a swivel door frame 101, a manipulating chamber bottom surface 104, a manipulating chamber frame 51, and a manipulating chamber top surface 25.

A proximal side of the manipulating chamber is demonstrated to show the interior space and exterior walls that define the chamber structure. The opening accommodates the attachment of a restraint chamber relative to the cage portion, exterior surface, top surface, and bottom surface. The interior space is suitable for accommodating an NHP. A swivel door that guides the NHP through the manipulating chamber to the restraint chamber is operated manually with a swivel handle connected to the swivel door and accessible through the manipulating chamber top surface. The swivel door and handle can be locked or held in place by fastening the swivel hook and the swivel lock.

Figure 4:
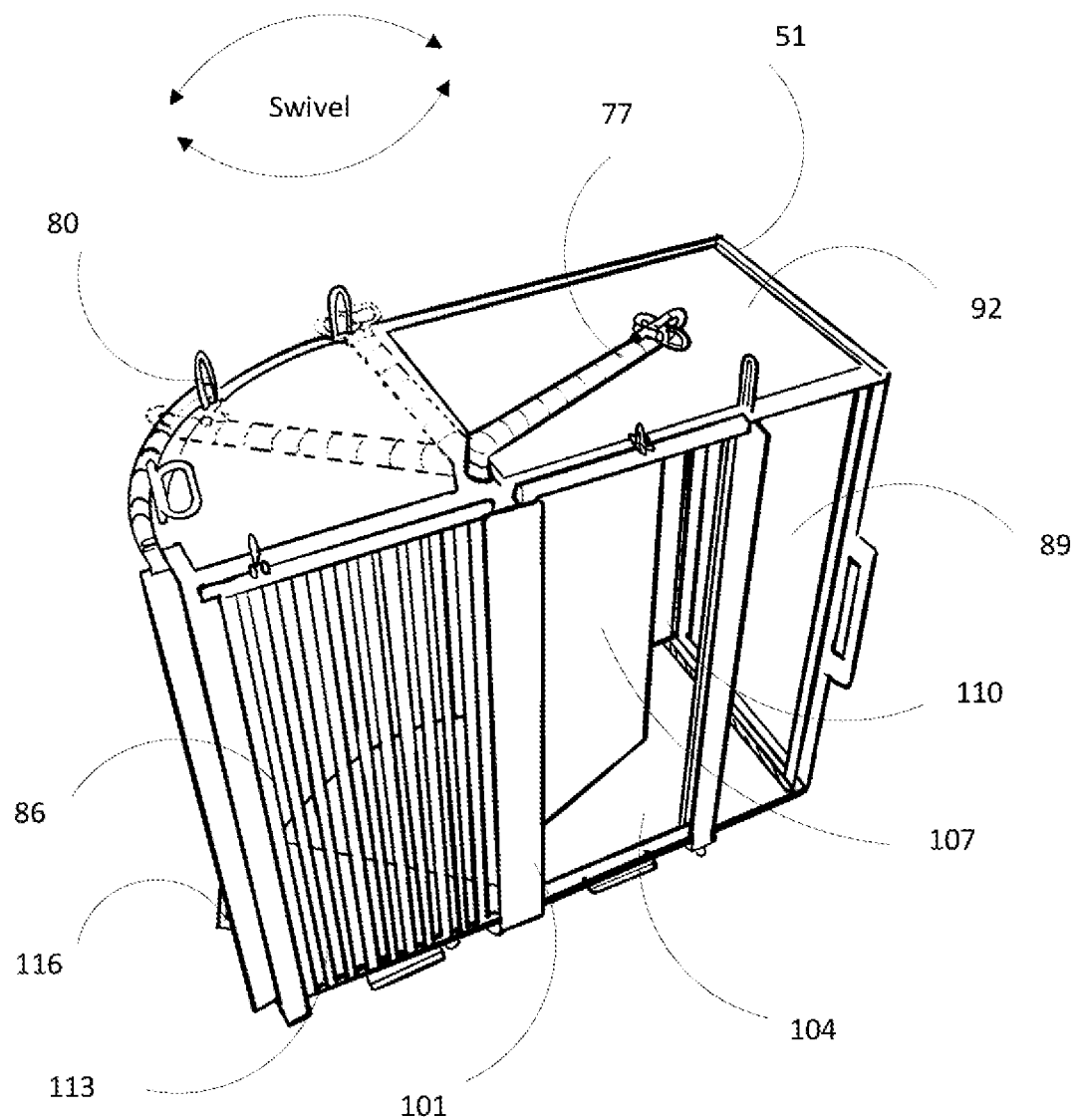
FIG. 4 shows a top front perspective view of an exemplary manipulating chamber.

Referring now to FIG. 4, a top front perspective view of an exemplary manipulating chamber is shown. The manipulating chamber 1 comprises a swivel door 107, an entrance from cage 110, an exit to restraint chamber 113, a mount hook receiver 116, a manipulating chamber bottom surface 104, a swivel door frame 101, manipulating chamber interior space 89, manipulating chamber exterior surface 92, manipulating chamber frame 51, a swivel handle 77, at least one swivel hook 80, and a cage portion 86.

The manipulating chamber may be present at the top, middle, or side of the system, even though the exemplary embodiment shows the manipulating chamber at the bottom of the system. The manipulating chamber may have a rectangular or other shaped box portion with a swivel shape at one end. Various attachments and modules may be integrated with the system at the manipulating chamber. For example, the manipulating chamber may be attached to a chute module commonly used in NHP facilities or attached directly to the NHP cage. Inside the manipulating chamber may be a swivel mechanism that allows comfortable and safe access to the NHP during evaluation or specimen collection.

A person operates the swivel handle to move the swivel door that moves in the interior space of the manipulating chamber as the NHP is led from its cage or chute through the entrance, to the cage portion, and through the exist to the restraint chamber. The cage portion allows the NHP to see to the outside and interact with the person or handler. This prevents NHP anxiety. The swivel door is connected to a door frame that is constructed from the frame. The frame defines a polygonal shape such as a square or rectangle with one side having a curved quarter-circle shape, and a flat side with the entrance and exit. The swivel door travels in a substantially semi-circle shape with the cage portion frame constructed in the curved quarter-circle shape that leads to the exit to the restraint chamber. The design encourages the feel of game play for the NHP to reduce stress and anxiety that may affect test results.

Figure 5:
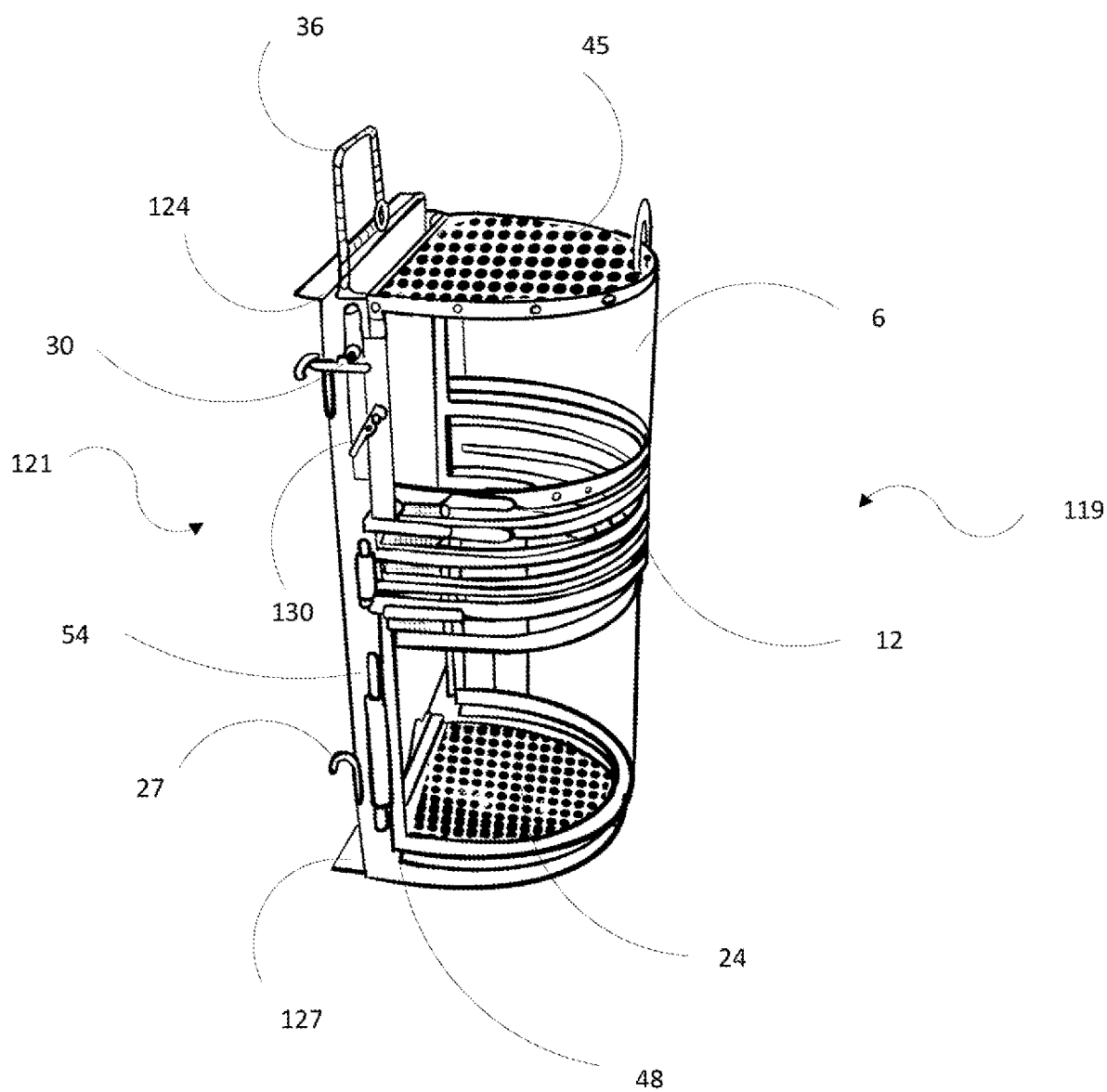
FIG. 5 shows a side view of an exemplary restraint chamber.

Referring now to FIG. 5, a side view of an exemplary restraint chamber is shown. The exemplary restraint chamber 3 as shown is defined by a proximal end 119 and a distal end 121. The side view serves to show a top overhand 124, bottom platform 127, and at least one screen lock 130 along with a carrying handle 36, a top surface 45, upper part 6, middle portion 12, bottom surface 24, restraint chamber frame 48, mounting hook 27, restraint chamber side frame 54, and fastener 30.

Generally, the rear of the system comprises a door within a back frame. In some embodiments, the door may have a lower slit at the bottom to allow the NHP's tail to comfortably be placed outside the system chamber. The back frame may have at least one hook for attaching the system onto the NHP's cage. Once attached to the cage, the door is lifted and may be held in place by a bracket, hook, or lock, or combinations thereof. The NHP's cage door is opened, and the NHP voluntarily enters the system. The system's door is closed, and the cage door is closed. The system or only the restraint chamber may be removed from the cage or may remain hooked onto the cage during evaluation or specimen collection.

When the restraint chamber is attached to either a cage, chute, or a manipulating chamber, the at least one hook will correspond to at least one hook receiver to substantially hold the restraint chamber securely. The top overhang and bottom platform may be placed within the frame of the manipulating chamber's exist to restraint chamber to minimize gaps between the chambers and to provide stability for the NHP when moving from one chamber to the other.

While in the restraint chamber, the NHP may be accessed at the upper part or the lower part. Both parts or either part may be protected with a screen that may be constructed from a solid material such as fiberglass or a woven material such as a mesh or wire screen. Either screen is locked in place by screen fasteners which may be bars or levers placed over the screen to hold the screen against the restraint chamber frame. Fasteners such as locks, bolts, screws, magnets, or adhesives may also be used.

Figure 6:
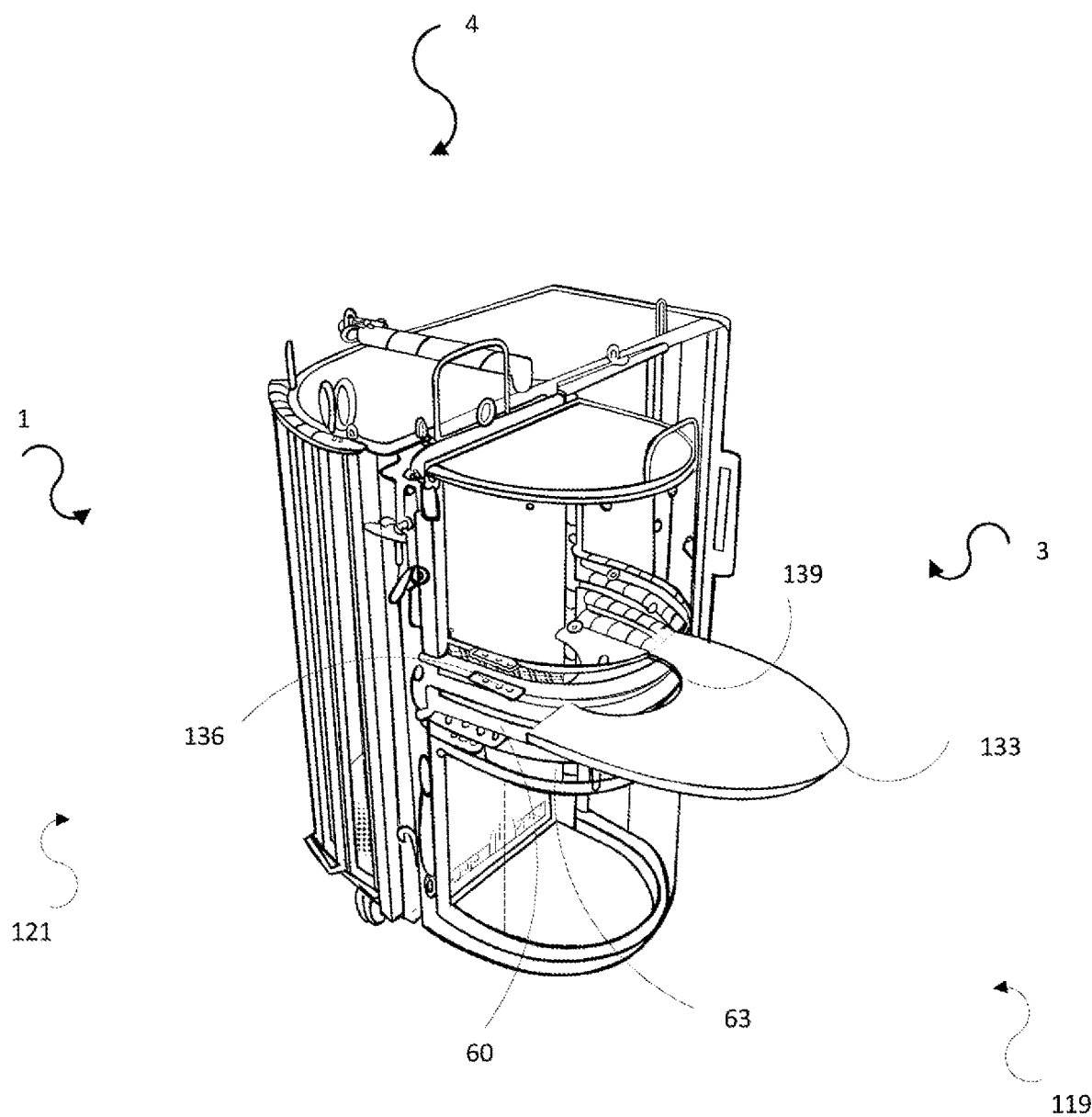
FIG. 6 shows a perspective view of an exemplary system complex of a manipulating chamber and a restraint chamber with a platform.

Referring now to FIG. 6, a perspective view of an exemplary system complex of a manipulating chamber and a restraint chamber with a platform is shown. The system complex 4 comprising the manipulating chamber 1 and restraint chamber 3 is defined by proximal end 119 and distal end 121. A platform 133 is inserted between divider slot rails 60 and into a divider slot 63. The platform has a platform cutout 139. The platform is substantially secured in place by at least one platform lock 136.

From the proximal end, the platform is inserted into the restraint chamber interior space with the platform cutout substantially contouring around the body of an NHP. The platform cutout may be in a semi-circle shape or any other shape suitable for preventing movement of the NHP's arms and hands below the platform. The NHP is preferably facing toward the proximal end for engagement in human interaction and for resting its arms on top of the platform. The platform is held in place by at least one platform lock positioned on either side of the divider slot rails. The platform lock may comprise a bar that swivels over the top of the platform or may otherwise secure the platform with corresponding snaps, magnets, hook-and-loop closures, or adhesives. The platform is removably attached.

The restraint chamber may have various safeguards to further restrict the NHP's movement. For example, a safeguard may be a non-constrictive attachment that may be inserted into the system at about the NHP's waist level. The attachment may provide a platform by which the NHP may rest its upper limbs, similar to an NHP being seated at a table. The attachment also provides a visual barrier for the NHP when biological specimens are collected from the NHP's lower body. This reduces anxiety and stress for the NHP while also providing an extra safety barrier to protect the laboratory personnel from bites and scratches.

Conclusion

A number of embodiments of the present disclosure have been described. While this specification contains many specific implementation details, these details should not be construed as limitations on the scope of any disclosures or of what may be claimed but rather as descriptions of features specific to particular embodiments of the present disclosure.

Thus, particular embodiments of the subject matter have been described. Other embodiments are within the scope of the following claims. In some cases, actions recited in the claims can be performed in a different order and still achieve desirable results. Nevertheless, it will be understood that various modifications may be made without departing from the spirit and scope of the claimed disclosure.

What is claimed is:

1. A non-human primate system, the system comprising
A restraint chamber comprising a semi-cylindrical frame defining an upper part having an upper screen, a middle portion having a plurality of divider slot rails and divider slots, and a lower part having a lower screen, a flat cage door, a top surface, and a bottom surface; and
A manipulating chamber comprising a frame defining a solid walled rectangle or square side, a quarter-circle cage portion, an exit to restraint chamber, and a proximal door.

2. The non-human primate system of claim 1 wherein the restraint chamber contains at least one mount hook, and the manipulating chamber contains at least one mount hook receiver compatible for receiving said mount hook.

3. The non-human primate system of claim 1 wherein the manipulating chamber further comprises a swivel door in an interior space of the manipulating chamber, and wherein the swivel door is connected to a swivel handle accessible through a top surface of the manipulating chamber, and wherein the swivel handle is hand-operated.

4. The non-human primate system of claim 3 whereby the swivel door is moved by the swivel handle from a closed position at a proximal door, through the interior space of the manipulating chamber, along the cage portion, and to the exit to restraint chamber.

5. The non-human primate system of claim 1 wherein the restraint chamber further comprises a semi-cylindrical upper section top frame connected to a restraint chamber side frame and an upper section bottom frame connected to a restraint chamber side frame, wherein a space between the upper section top frame and the upper section bottom frame accommodates the upper screen removably attached to the restraint chamber side frame.

6. The non-human primate system of claim 5 wherein the upper screen of the restraint chamber is made of a solid transparent material such as acrylic.

7. The non-human primate system of claim 1 wherein the restraint chamber further comprises a semi-cylindrical lower part defined by a lower section upper frame connected to the restraint chamber side frame and a lower section bottom frame connected to the restraint chamber side frame, wherein a space between the lower section upper frame and the lower section bottom frame accommodates a lower screen removably attached to the restraint chamber side frame.

8. The non-human primate system of claim 7 wherein the lower screen of the restraint chamber is made of a wire mesh removably attached to the restraint chamber side frame.

9. The non-human primate system of claim 1 wherein the middle portion of the restraint chamber further comprises a semi-cylindrical platform with a platform cutout, whereby the semi-cylindrical platform is inserted between divider slot rails and through a divider slot, wherein the platform cutout is positioned to face distally toward the restraint chamber cage door.

10. The non-human primate system of claim 9 wherein the platform cutout substantially fits around a midsection of an upright NHP present in the interior space of the restraint chamber and whereby the NHP can rest its upper limbs on the platform.

11. The non-human primate system of claim 10 whereby the platform prevents the NHP from scratching or biting its lower body positioned below the platform.

12. A method of using a non-human primate restraint system comprising:
a restraint chamber comprising a semi-cylindrical frame defining an upper part having an upper screen, a middle portion having a plurality of divider slot rails and divider slots, and a lower part having a lower screen, a flat cage door, a top surface, and a bottom surface; and a manipulating chamber comprising a frame defining a solid walled rectangle or square side, a quarter-circle cage portion, an exit to restraint chamber, and a proximal door;

the method steps comprising:

attaching the manipulating chamber to an NHP cage or chute by securing an entrance from the manipulating chamber against the NHP cage or chute;

opening an entrance from the cage by moving a swivel handle connected to a swivel door away from the entrance from the cage and toward the cage portion and toward the exit to the restraint chamber;

guiding the NHP from the entrance to the cage portion to the exit with the swivel door moving behind the NHP;

raising the restraint chamber cage door, guiding the NHP from the cage portion to the exit and into the restraint chamber interior space;

lowering the restraint chamber cage door;

locking the restraint chamber cage door;

inserting a platform at the middle portion of the restraint chamber to separate the NHP's upper body from the NHP's lower body;

removing a lower part screen;

accessing the NHP's lower body; and obtaining from the NHP a biological sample such as blood or urine.

13. The method of using a non-human primate restraint system of claim 12 further comprising providing the NHP with a toy to manipulate while a biological sample is obtained from the NHP.

14. The method of using a non-human primate restraint system of claim 12 further comprising distracting the NHP with human interaction.

15. The method of using a non-human primate restraint system of claim 12 whereby the NHP is encouraged and willing to enter the restraint chamber without physical handling of the NHP.

* * * * *